(12) United States Patent
Kawasumi et al.

(10) Patent No.: US 7,675,263 B2
(45) Date of Patent: Mar. 9, 2010

(54) METHOD FOR CONTROLLING BATTERY PACK

(75) Inventors: Atsushi Kawasumi, Sumoto (JP); Toru Nishikawa, Sumoto (JP)

(73) Assignee: Sanyo Electric Co., Ltd., Osaka (JP)

( * ) Notice: Subject to any disclaimer, the term of this patent is extended or adjusted under 35 U.S.C. 154(b) by 454 days.

(21) Appl. No.: 11/703,172

(22) Filed: Feb. 7, 2007

(65) Prior Publication Data

US 2007/0188148 A1  Aug. 16, 2007

(30) Foreign Application Priority Data

Feb. 8, 2006  (JP) ............................... 2006-031685

(51) Int. Cl.
- *H02J 7/00* (2006.01)
- *F21L 4/00* (2006.01)
- *H01M 2/10* (2006.01)
- *H04M 1/00* (2006.01)

(52) U.S. Cl. ....................... 320/112; 320/110; 320/132; 320/135; 320/136; 362/183; 429/96; 429/97; 455/573

(58) Field of Classification Search ................. 320/114, 320/112, 110, 135, 136

See application file for complete search history.

(56) References Cited

U.S. PATENT DOCUMENTS 5,903,131 A * 5/1999 Sekine et al. ............... 320/106

FOREIGN PATENT DOCUMENTS

| JP | 9-261883 | | 10/1997 |
|---|---|---|---|
| JP | 2000-340267 | * | 8/2000 |
| JP | 2000-340267 | | 12/2000 |

* cited by examiner

*Primary Examiner*—Edward Tso
*Assistant Examiner*—Yalkew Fantu
(74) *Attorney, Agent, or Firm*—Wenderoth, Lind & Ponack, L.L.P.

(57) ABSTRACT

A battery pack includes a switching element, a heat resistor, and a fuse. The switching element turns to ON if the battery pack becomes in an abnormal state. The heat resistor is connected to the switching element and a battery in series. Current flows through the heat resistor when the switching element turns to ON. The fuse is located in a position where the fuse is heated by the heat resistor through which the current flows. The fuse is connected to the battery in series so that the fuse is disconnected with heat by the heat resistor at high temperature. Thus, the fuse cuts off a current flow in the battery. If the battery pack is in an abnormal state, when the capacity or voltage of the battery is less than a preset capacity or voltage value, the fuse is disconnected with heat by turning the switching element to ON.

21 Claims, 2 Drawing Sheets

METHOD FOR CONTROLLING BATTERY PACK

BACKGROUND OF THE INVENTION

1. Field of the Invention

The present invention relates a method for controlling a battery pack.

2. Description of the Related Art

Japanese Patent Laid-Open Publication TOKUKAI No. HEI 9-261883, and Japanese Patent Laid-Open Publication TOKUKAI No. 2000-340267 disclose various types of battery abnormality detection methods. In these publications, the methods detect states where rechargeable batteries cannot be properly used due to deterioration of the rechargeable batteries, large property variation between them, a short circuit in any of them, or the like. If such states are detected, a fuse that is connected to the batteries in series is disconnected with heat that is generated by applying current to a heat resistor located in a position capable of heating the fuse. As a result, a battery pack cannot be used. Additionally, in Japanese Patent Laid-Open Publication TOKUKAI No. 2000-340267, the current that flows through the heat resistor is controlled to a constant current, thus, the heating current is optimized.

SUMMARY OF THE INVENTION

In these types of battery packs, in a case where batteries are in an abnormal state, when the fuse is disconnected with heat by applying current to the heat resistor, if battery voltage is low, current may not be sufficiently applied to the heat resistor. If the current is not sufficiently applied, the fuse may not be disconnected with heat.

The present invention is aimed at solving the above problem, and its object is to provide a method for controlling a battery pack that reliably disconnect a fuse with heat.

A battery pack according to the present invention includes a switching element, a heat resistor, and a fuse. The switching element turns from OFF to ON if the battery pack with a rechargeable battery becomes in an abnormal state. The heat resistor is connected to the switching element and the battery in series. Current flows through the resistor, when the switching element turns to ON. The fuse is located in a position where the fuse is heated by the heat resistor through which the current flows. The fuse is connected to the battery in series so that the fuse is disconnected, fused, or melted with heat by the heat resistor at high temperature when the current flows. Thus, the fuse cuts off a current flow in the battery. Particularly, in the battery pack according to the present invention, if the battery pack becomes in an abnormal state, when the capacity or voltage of the rechargeable battery is less than a preset capacity or voltage value, after the rechargeable battery is charged so that its capacity or voltage reaches the preset capacity or voltage value, the fuse is disconnected with heat.

Furthermore, a method according to the present invention controls a battery pack including a rechargeable battery, a fuse that is connected to the rechargeable battery in series, and control circuit that determines whether the battery pack is in abnormal state including the battery. In the method, the rechargeable battery discharges through the fuse so that the fuse disconnected with heat by discharge current in this discharge operation. In addition, in the method for controlling the battery pack according to the present invention, if the battery pack becomes in an abnormal state, when the capacity or voltage of the rechargeable battery is less than a preset capacity or voltage value, after the rechargeable battery is charged so that its capacity or voltage reaches the preset capacity or voltage value, the fuse is disconnected with heat.

According to the present invention, since, if the battery pack becomes in an abnormal state, when the capacity or voltage of the rechargeable battery is less than a preset capacity or voltage value, after the rechargeable battery is charged so that its capacity or voltage reaches the preset capacity or voltage value, the fuse is disconnected with heat, it is possible to reliably disconnect the fuse with heat.

The above and further objects of the present invention as well as the features thereof will become more apparent from the following detailed description to be made in conjunction with the accompanying drawings.

DETAILED DESCRIPTION OF THE PREFERRED EMBODIMENT

Figure 1:
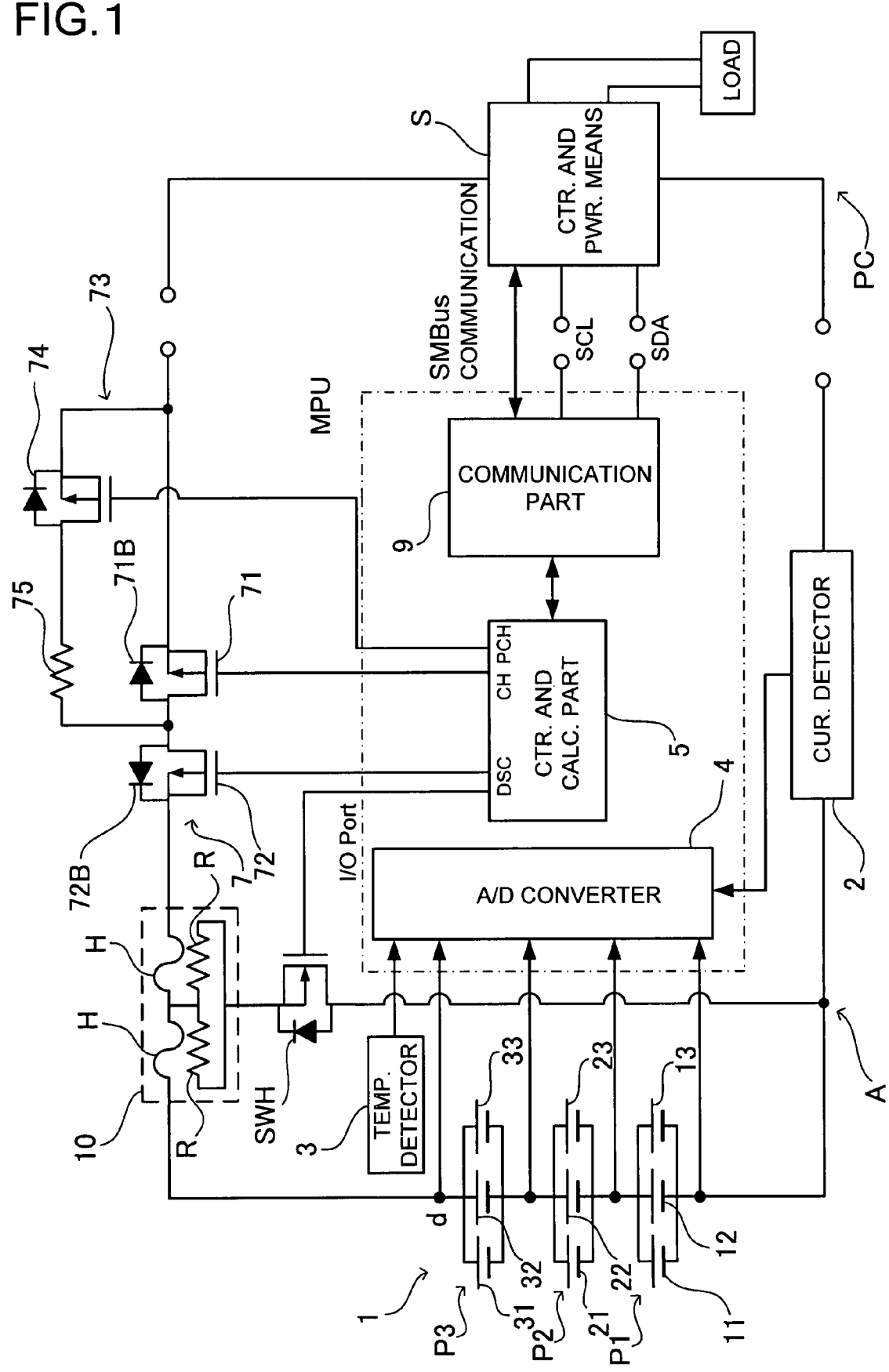
FIG. 1 is a circuit block diagram of a battery pack according to one embodiment of the present invention.

An embodiment of the present invention will be described with reference to drawings. As shown in FIG. 1, a battery pack A, and a mobile device PC as electronic equipment with a power source, which charges the battery pack A, are provided in this embodiment. The mobile device PC is a mobile personal computer such as note type personal computer. Typically, the battery pack A has structure that can be detachably attached to the mobile device PC. The mobile device PC includes control-and-power means S. The control-and-power means S is provided with direct-current power, which is provided from an adaptor (not shown). The adaptor converts commercial alternating-current power through a wall outlet into the direct-current power. The control-and-power means S includes a microcomputer, which controls this power for power supply. The power supply from the control-and-power means S is used to charge the battery pack A or is provided to a load L of the mobile PC. On the other hand, when power is not provided from the commercial power supply, power is provided from the battery pack A, and the provided power operates the power circuit S and the load L.

The battery pack A includes a rechargeable battery 1 such as lithium-ion battery and nickel-hydrogen battery, a current detection portion 2, and a microprocessor unit (hereinafter referred to as "MPU"). The current detection portion 2 detects current in the battery 1 in charge/discharge operation, and is composed of a resistor or the like. The MPU monitors and controls charge/discharge operation for the battery 1. In addition, the battery pack A includes a temperature detection portion 3 containing a thermistor located close to the battery 1.

In this embodiment, as in the illustrated battery 1, blocks P1, P2 and P3 include battery cells 11, 12 and 13, battery cells 21, 22 and 23, and battery cells 31, 32 and 33, respectively. In each block, three battery cells are electrically connected in parallel. These blocks P1, P2 and P3 are connected in series. In this type of electrical connection, plate-shaped metal pieces as tabs are connected to positive and negative electrodes of battery cells by spot welding, thus, the battery cells are electrically connected. In a case of lithium-ion rechargeable battery, battery cells of about 2000 mAh/cell are employed.

The MPU includes an A/D conversion portion 4 that is provided with the total battery voltage (measured at a point d), voltage of each block and analog voltage of outputs from the current and temperature detection portions 2 and 3, and coverts them into digital data to calculate an actual voltage (mV), an actual current value (mA) and so on. Outputs are provided from the A/D conversion portion 4 to a charge/discharge control and calculation portion 5 as control circuit. The control and calculation portion 5 performs calculation, comparison, determination and so on. A control component 7 is controlled with signals from the control and calculation portion 5 so that the control component 7 turns to ON/OFF. The control component 7 is composed of switching transistors or the like.

In other words, the control-and calculation portion 5 integrates charge-and-discharge current values for remaining capacity calculation processing, detects full-charge of the battery 1, and controls charge/discharge operation if detecting abnormal current, abnormal temperature or abnormal voltage. The control component 7 composed of switching transistors or the like is controlled to ON/OFF, and thus cuts off current based on the control signals from the control and calculation portion 5 if abnormal current, abnormal temperature or abnormal voltage is detected. The control and calculation portion 5 integrates values each of which is obtained by multiplying a charge-and-discharge current converted by the A/D conversion portion 4 by a measurement unit period (e.g., 250 msec). The control and calculation portion 5 can subtract the value obtained by the integration from a full-charge value in discharge operation. In charge operation, the control and calculation portion 5 can add the value obtained by the integration to the remaining capacity when the charge operation is started. Such calculation is known in the art. The remaining capacity (Ah) of the battery 1 is calculated based on this type of calculation. Instead of the remaining capacity based on this type of current integration, the control and calculation portion 5 can calculate power integration value (Wh) as the remaining capacity. The power integration value (Wh) can be obtained by integrating values each of which is obtained by multiplying voltage and current at a measurement point by the measurement unit period.

The control and calculation portion 5 stores various types of data in memories. The control and calculation portion 5 includes a CPU (central processing unit), and includes various types of memories. The control and calculation portion 5 includes a program memory that stores a program for controlling operation of the battery pack A. The program memory is a nonvolatile storage medium. A ROM (read-only memory) previously stores data required for program execution and so on. A RAM (random-access memory) temporarily stores a part of program and various types of data. The control and calculation portion 5 additionally includes an EEPROM (electrically erasable programmable ROM) or a flash memory. The EEPROM or flash memory stores software for execution of the CPU, set data, data required to be saved even if the MPU shuts down (e.g., learned capacity, cycle number, data of abnormal state, etc.), and so on before the shutdown happens. The EEPROM or flash memory can rewrite them if necessary.

The control and calculation portion 5 additionally includes various types of timers and counters. They are used for time measurement, count measurement, and so on.

In a case where the battery 1 is a nickel-hydrogen battery or the like, the control and calculation portion 5 determines the full-charge state in a known manner such as detection of the peak voltage or –ΔV of battery voltage (=voltage drop), and the use of the calculated remaining capacity. In a case where the battery 1 is a lithium-ion battery, through the use of constant current (maximum current about 0.5 to 1 C) and constant voltage (maximum about 4.2 V/cell) charge operation in which current and voltage are regulated, the full-charge state is determined when voltage is not less than a preset value, and when current is not more than a preset value. When the full-charge state is determined, the control and calculation portion 5 provides information that indicates that the remaining capacity is 100%. The full-charge information can be provided also to the electronic equipment through a communication line.

In order to cut off charge or discharge current, the control and calculation portion 5 provides signals to the control component 7 composed of charge and discharge FET elements 71 and 72. The charge FET elements 71 is a p-channel type FET as charge control element. The discharge FET element 72 is a p-channel type FET as discharge control element. The signals control them to ON/OFF. In addition, instead of p-channel type FETs, charge and discharge FETs of n-channel type FETs can be used together with a charge pump. In this case, a p-channel type FET is used as a later-described preliminary charge FET 74.

In the case where the battery 1 is a lithium-ion battery, when the voltage of the battery 1 becomes over-charge voltage (e.g., 4.2 V/cell) or more, in order to control the charge FET 71 so that the charge FET 71 turns to OFF, the control and calculation portion 5 provides an OFF signal (the OFF signal corresponds to a signal of High voltage, because the OFF signal is applied to a gate of p-channel type FET of the element 71) through a port CH. On the other hand, when the voltage of the battery 1 becomes over-discharge voltage (e.g., 2.7 V/cell) or less, in order to control the discharge FET 72 so that the discharge FET 72 turns to OFF, the control and calculation portion 5 provides an OFF signal (the OFF signal corresponds to a signal of High voltage, because the element 72 applies the OFF signal to a gate of p-channel type FED through a port DSC. As discussed above, since the signals are applied to the gates of the p-channel type FETs of the elements 71 and 72, the voltage of the OFF signals corresponds to signals of High voltage, on the other hand, the voltage of ON signals correspond to signals of Low voltage. In an over-charge state, the control and calculation portion 5 provides the OFF signal through the port CH, and thus stops charge operation. In this state, since DSC is provided with the ON signal, the discharge FET element 72 is in an ON state, thus, the mobile device PC can perform discharge operation through a parasitic diode (body diode) 71B of the charge FET element 71 in an OFF state. In an over-discharge state, the control portion 5 provides the OFF signal through the port DSC, and thus stops discharge operation. In this state, since CH is provided with the ON signal, the charge FET element 71 is in an ON state, thus, the mobile device PC can perform charge operation through a parasitic diode (body diode) 72B of the discharge FET element 72 in an OFF state.

In addition, in the battery pack A according to this embodiment includes a preliminary charge circuit 73 that performs preliminary charge operation at a reduced current value instead of normal charge operation in a case where the lithium-ion battery 1 is left at voltage lower than the over-discharge voltage. The preliminary charge circuit 73 includes a resistor 75 and the preliminary charge FET element 74. The resistor 75 reduces charge current. The preliminary charge FET 74 is controlled based on instruction of the control and calculation portion 5 with an ON/OFF signal through a port PCH. When charge operation starts, in a case of battery voltage not more than the over-discharge voltage or the like, the control and calculation portion 5 provides an OFF signal through the port CH so that the charge FET element 71 turns to OFF, and provides an ON signal through the port PCH so that the preliminary charge FET element 74 turns to ON in the thus-constructed preliminary charge circuit 73. In this operation, when charge current is provided from the mobile device PC, the charge current is reduced by the resistor 75, and the battery 1 is charge with the reduced charge current through the preliminary charge FET element 74 in an ON state. If the battery voltage reaches a preset value (e.g., 3.0 V/cell) within a preset period (e.g., 90 minutes) from the charge operation start, the control and calculation portion 5 turns the preliminary charge FET element 74 OFF, and turns the charge FET element 71ON so that the aforementioned normal charge is performed. On the other hand, if the battery voltage is less than the preset value (e.g., 3.0 V/cell) until the preset period (e.g., 90 minutes) elapses from the charge operation start, the battery pack A is determined as in an abnormal state where it cannot be properly charged due to battery deterioration, thus, the charge operation is stopped. This types of determination result of abnormality is transmitted to the mobile device PC through communication process if necessary.

The MPU includes a communication portion 9 that transmits various types of battery information such as battery voltage, remaining capacity and charge-and-discharge current value, and various types of instruction information to the control-and-power means S of the mobile device PC. The communication portion 9 performs communication processing between the battery pack A and the mobile device PC as follows. The communication portion 9 includes a communication data creation portion and a driver portion. The communication data creation portion creates signal data that can be received by the mobile device PC based on the various types of battery information such as battery voltage, remaining capacity and charge-and-discharge current value. The driver portion performs actual communication. The communication data creation portion uses memories in the control and calculation portion 5 for storing various types of parameters for remaining capacity calculation and various types of data. In addition, the driver portion receives transmission requirement of various types of information about the battery pack from the electronic equipment, and then transmits data created by the communication data creation portion to the electronic equipment Known SMBus or the like can be used as communication system. The system has transmission/reception function of data signal and so on through two communication lines of data line SDA and clock line SCL.

The battery pack A is used in a case where commercial power is not available, for example, in a case where the mobile device PC is on the road. For this reason, the battery 1 is usually stored in a state close to the full-charge state in a case where the mobile device PC can be provided with commercial power or the like. On the other hand, a blackout seldom occurs in normal cases. Therefore, the remaining capacity of the battery 1 reduces due to self-discharge of the battery and power consumption in the battery pack A. The charge/discharge control and calculation portion 5 starts recharge operation when the remaining capacity of the battery 1 reduces to a recharge capacity level due to self-discharge, power consumption of the circuit, and so on. The recharge capacity level can be calculated by subtracting integrated current values in preset periods from the full-charge capacity, or can be obtained based on battery voltage corresponding to the recharge remaining capacity level. The recharge remaining capacity level can be set to 90% of the full-charge capacity.

In this embodiment, the control and calculation portion 5 obtains the remaining capacity through the following process. In discharge operation of the battery 1, the control and calculation portion 5 calculates the remaining capacity of the battery 1 as integration amount of current or integration amount (Ah) by subtracting a discharge amount from a total discharge amount (=learned capacity) as the total capacity of the battery 1 discussed later. In addition, in the discharge operation, the control and calculation portion 5 calculates a remaining capacity percentage of the battery 1 based on a relationship formula of (remaining capacity percentage)=(total capacity−integration amount)/(total amount). A charge capacity is calculated based on an integration amount of charge current for the battery 1 or a value that is obtained by multiplying this integration amount by a charge efficiency value. The discharge amount is calculated based on an integration amount of discharge current or a value in consideration of discharge efficiency. The integration portion 5 can calculate the remaining capacity based on an integration amount of electric power (Wh) instead of current integration. The integration amount of electric power is calculated by subtracting discharge electric power from charge electric power.

In this case, the total capacity (=learned capacity) of the battery at some point in time can be an integration amount (Ah or Wh) in discharge operation where current is discharged from the full-charge state to the full-discharge state, or an integration amount (Ah or Wh) in charge operation where current is charged from the full-discharge state to the full-charge state. The total capacity at some point in time can be total capacity values that are obtained by any other methods if the methods can provide a total capacity value.

While discharge operation is in process, the control and calculation portion 5 corrects the remaining capacity based on a voltage signal provided from the A/D conversion portion 4. When the A/D conversion portion 4 provides a signal that indicates that the voltage of the battery 1 reaches or reduces to a first voltage value, the control and calculation portion 5 corrects the calculated remaining capacity percentage based on preset first remaining capacity value (percentage) Ya1 (e.g., 8%) corresponding to the first voltage value (e.g., lithium-ion battery 3.6 V/cell).

In other words, in a case where the first remaining capacity value Ya1 is set to remaining capacity 8%, when the calculated remaining capacity becomes 9%, the control and calculation portion 5 holds the remaining capacity as 9% until the battery voltage of the rechargeable battery 1 reduces to the first voltage value V1. On the other hand, in a case where the calculated remaining capacity is not less than 9%, when the battery voltage of the rechargeable battery 1 reduces to the first voltage value V1, at this point, the control and calculation portion 5 corrects a value of the calculated remaining capacity to 8%.

In a case where the discharge operation is continued, when receiving a signal that indicates that the voltage of the battery 1 reduces to preset discharge stop voltage value, the control and calculation portion 5 corrects the calculated remaining capacity to zero. The reason is that when the battery voltage reduces to the discharge stop voltage value, the actual capacity of the battery 1 is zero as lower limit capacity. Thus, the control and calculation portion 5 calculates and stores discharge current integration amount from the discharge start to the discharge stop voltage value as the total discharge amount (=total capacity).

After obtaining the total discharge amount (learned capacity), the control and calculation portion 5 uses this total discharge amount until obtaining another total discharge amount in next calculation. In addition to the first voltage value corresponding to the first remaining capacity value (percentage), the calculated remaining capacity may be corrected based on a second voltage value corresponding to a second remaining capacity value (percentage) less than the first remaining capacity value (percentage) (e.g., 3%). Since the first voltage value corresponding to the aforementioned remaining capacity value (percentage), discharge stop voltage, and so on, are temperature-dependent, voltage that is corrected based on current and temperature in use can be used.

In this embodiment, if it is determined that the battery is in abnormal states discussed later, the charge/discharge control and calculation portion 5 informs the abnormal states to the mobile device PC side through the communication processing portion 9. Subsequently, in order to stop the use of the battery pack A, the charge/discharge control and calculation portion 5 disconnects fuses H in series connection with the battery 1 with heat. A resistor heat type fuse 10 including these types of fuses H is market-available, and has structure that has heat resistors R connected in parallel to an intermediate point between the fuses H as shown in FIG. 1. In order to disconnect the fuses H, the heat resistor R, and the fuses H are thermally coupled. In the construction, a disconnection circuit includes the resistor heat type fuse 10, and a switching element SWH such as FET. The switching element SWH is connected to the resistor heat type fuse 10 in series. The disconnection circuit is connected between positive and negative sides of the rechargeable battery 1. The charge/discharge control and calculation portion 5 controls a gate signal for the switching element SWH. If the battery pack is determined as in an abnormal state, when the charge/discharge control and calculation portion 5 turns the switching element SWH ON, current flows into the heat resistors R from the battery 1 or the mobile device PC to heat the fuses H. Thus, the heat resistors R generate heat, and the fuses H are disconnected with heat In this construction, after that, the battery pack A can be out of use.

In this embodiment, for example, the following abnormal states are determined. However, note that abnormal states other than them can be used in the present invention.

For example, in a case where abnormal temperature or over-current is detected, even though the control and calculation portion 5 controls the charge FET element 71 as charge control element and the preliminary discharge FET element 74 to OFF, in a state where charge voltage and charge electric power are applied from the mobile device PC, if the current detection portion 2 detects charge current, the control and calculation portion 5 determines that abnormality occurs in the following cases. It is determined that abnormality occurs if it is detected that the current flows at a rate not less than a first current value (e.g., 100 mA) during a first detection period (e.g., 20 seconds) shorter than a second detection period (e.g., 90 seconds). In addition, it is determined that abnormality occurs if it is detected that the current flows within a preset current range, that is, at a rate less than the first current value and not less than a second current value (e.g., 20 mA) during the second detection period (e.g., 90 seconds) longer than the first detection period (e.g., 20 seconds). In order to determine this type of abnormality of the charge FET element 71 and preliminary charge FET element 74, the battery pack A constantly automatically makes a check (=self-check).

In charge or discharge operation, or in a state where current does not flow (in a state where the battery pack A is left separately, or in a state where the battery is not used when the mobile device PC is operated with commercial power), if the temperature goes out of a preset range (0-60° C.), the battery pack A is determined as in an abnormal state.

If a short circuit or a phenomenon that causes a short circuit (=micro short circuit) occurs in the cell, the battery pack A is determined as in an abnormal state. In a case where discharge or charge current does not flow, if the voltage variation is not less than a preset value (about 10-50 mV, e.g., 20 mV) in a preset period (about 15-60 minutes, e.g., 30 minutes) in each block cell, the battery pack A is determined as in an abnormal state. In addition, in discharge or charge operation, if the voltage variation in one block cell is not less than 50 mV in a preset period (e.g., 3 minutes) and is not less than substantially twice as large as the voltage variation of other block cell, the battery pack A is determined as in an abnormal state.

In discharge or charge operation, in the battery 1 that is provided with the blocks P1 through P3 connected in series, in a case where the blocks remains in the series connection, if an abnormal state where one or two cells are out of electrical connection with other cell(s) in a block (hereinafter, referred to as a "tab disconnection abnormal state") occurs, the battery pack A is determined as in an abnormal state. In a case where this type of tab disconnection is determined, if a current of 1.5 A flows, in a state where only two cells are available caused by tab disconnection in one three-parallel-block, the block becomes a two-parallel-cell block. As a result, the cell voltage variation also becomes large due to the large current per cell. For example, in discharge or charge operation, as for exemplary variation per cell, in three-parallel-cell structure, in a case where voltage variation is not less than 45 mV in a case of 500 mA for one cell in the preset period (e.g., 3 minutes), if tab disconnection occurs in one cell, available cells becomes two. Thus, since an increased current 750 mA flows in each available cell, the voltage variation in the preset period (e.g., 3 minutes) becomes a large value (e.g., 70 mV). The control and calculation portion 5 detects this voltage variation, and thus determines an abnormal state as tab disconnection. Specifically, the control and calculation portion 5 detects the voltage variation of blocks. If the variation in one block is not less than a preset value (e.g., 50 mV) in 3 minutes and the variation of the block is not less than substantially twice as large as the voltage variation of other block, the control and calculation portion 5 determines that the battery pack A is in the tab disconnection abnormal state.

Figure 2:
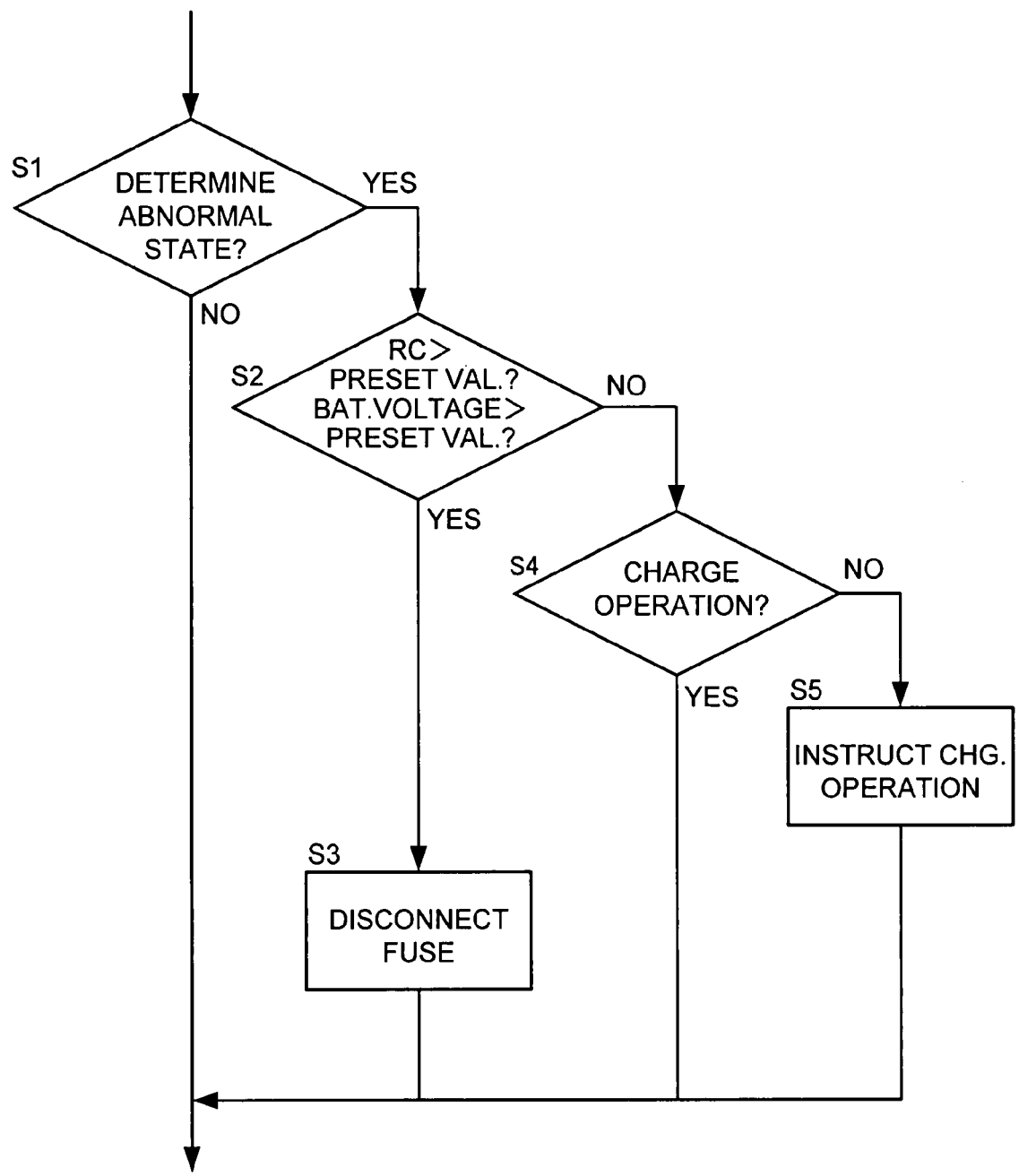
FIG. 2 is a flow chart of one embodiment of the present invention.

Steps in a control method according to this embodiment will be now described with reference to flow chart of FIG. 2. In step S1, the charge/discharge control and calculation portion 5 as control circuit determines whether the aforementioned abnormal states occur. If NO (=it is determined that no abnormal state occurs), this determination of step S1 is repeated at a cycle period (e.g., 250 msec).

In step S1, if YES (it is determined that an abnormal state occurs), in step S2, it is detected whether the remaining capacity (=RC (remaining capacity)) of the battery 1 is not less than a preset value and the voltage of the battery 1 is not less than a preset value. In detection of step S2, it is preferable that detection is made as YES in step S2 if the both conditions of the remaining capacity and voltage not less than the preset values are satisfied, that is, the detection acts as an "and" function for the conditions. The reason is that the fuse H can be reliably disconnected with heat. Alternatively, detection may be made as YES if any of the condition of the remaining capacity not less than the preset value and the condition of the voltage not less than the preset value is satisfied, that is, the detection may act as an "or" function for the conditions.

In a case of lithium-ion battery, the preset value for voltage is to an extent of 2.7-3.5 V/cell, preferably, can be about 3 V/cell. The following preset values can be used for the remaining capacity of the battery 1. For the remaining capacity of the battery 1, the preset value can be an integration value of current (unit Ah, e.g., several mAh to 10 mAh, preferably 5 mAh) or an integration value of product of current and voltage (unit mWh, e.g., 30 to 100 mWh, preferably, about 50 mWh).

In a case where the remaining capacity is represented in the aforementioned remaining percentage, the preset value for the remaining capacity can be set to an extent of about 0.2-15%, preferably, an extent of about 10%. In step S2, if YES (=if the capacity is not less than the preset value and the voltage is not less than the preset value), go to step S3, and the fuse H is disconnected, fused, or melted with heat. Specifically, the charge/discharge control and calculation portion 5 applies an ON signal to a gate of the switching element SWH through an I/O port, thus, the switching element SWH turns ON. Current is provided mainly from the battery 1, and partially from the mobile device PC in some cases, thus, the current flows through the heat resistors R to heat them. Accordingly, the fuses H are disconnected with heat. As a result, after that, the battery pack A cannot be used.

On the other hand, in step S2, if NO (=if the capacity is less than the preset value or the voltage is less than the preset value), in step S4, it is detected whether the battery pack A is in charge operation. Specifically, the charge/discharge control and calculation portion 5 detects whether the charge current flows, and thus detect whether the battery pack A is in charge operation. In step S4, if the detection is made as YES (=in charge operation), the flow of FIG. 2 is repeated, and the battery A is charged until the condition of step S2 (whether the capacity is not less than the preset value and the voltage is not less than the preset value) is satisfied. In step S4, if NO (=not in charge operation), go to step S5, the battery pack A is provided with electric power from the mobile device PC based on process that transmits a charge requirement signal to the mobile device PC from the battery pack A and so on so that charge operation starts. In step S5, charge operation starts, and the flow of FIG. 2 is repeated at a cycle period. If the battery A is determined as in an abnormal state in step S1, the battery A is charged until the condition of step S2 (whether the capacity is not less than the preset value and the voltage is not less than the preset value) is satisfied.

It should be apparent to those with an ordinary skill in the art that while various preferred embodiments of the invention have been shown and described, it is contemplated that the invention is not limited to the particular embodiments disclosed, which are deemed to be merely illustrative of the inventive concepts and should not be interpreted as limiting the scope of the invention, and which are suitable for all modifications and changes falling within the spirit and scope of the invention as defined in the appended claims. The present application is based on Application No. 2006-31685 filed in Japan on Feb. 8, 2006, the content of which is incorporated herein by reference.

What is claimed is:

1. A method for controlling a battery pack including a switching element that turns from OFF to ON if the battery pack with a rechargeable battery is in an abnormal state, a heat resistor that is connected to the switching element and the rechargeable battery in series, and through which current flows when the switching element turns to ON, and a fuse that is located in a position where the fuse is heated by the heat resistor through which the current flows and is connected to the rechargeable battery in series so that the fuse is disconnected with heat by the heat resistor at high temperature when the current flows to cut off a current flow in the rechargeable battery, the method comprising:
   determining whether the battery pack is in an abnormal state;
   detecting whether the capacity or voltage of the rechargeable battery is less than a preset capacity or voltage value if it is determined that the battery pack is in an abnormal state; and
   disconnecting the fuse with heat by turning the switching element to ON after the rechargeable battery is charged if it is detected that the battery pack is in an abnormal state and the capacity or voltage of the rechargeable battery is less than the preset capacity or voltage value.

2. The method according to claim 1, wherein if the battery pack is in an abnormal state, when the capacity of the rechargeable battery is less than the preset capacity value, after the rechargeable battery is charged so that its capacity reaches the preset capacity value, the fuse is disconnected with heat by turning the switching element to ON.

3. The method according to claim 2, wherein if the battery pack is in an abnormal state, when the capacity of the rechargeable battery is less than capacity within a range from 30 mWh to 100 mWh as the preset capacity value, after the rechargeable battery is charged so that its capacity reaches the capacity within the range from 30 mWh to 100 mWh, the fuse is disconnected with heat by turning the switching element to ON.

4. The method according to claim 2, wherein if the battery pack is in an abnormal state, when the capacity of the rechargeable battery is less than capacity in a range from several mWh to 10 mWh as the preset capacity value, after the rechargeable battery is charged so that its capacity reaches the capacity within the range from several mWh to 10 mWh, the fuse is disconnected with heat by turning the switching element to ON.

5. The method according to claim 2, wherein if the battery pack is in an abnormal state, when the remaining capacity of the rechargeable battery is less than a percentage within a range from 0.2% to 15% as the preset capacity value, after the rechargeable battery is charged so that its remaining capacity reaches the percentage within the range from 0.2% to 15%, the fuse is disconnected with heat by turning the switching element to ON.

6. The method according to claim 1, wherein if the battery pack is in an abnormal state, when the voltage of the rechargeable battery is less than the preset voltage value, after the rechargeable battery is charged so that its voltage reaches the preset voltage value, the fuse is disconnected with heat by turning the switching element to ON.

7. The method according to claim 3, wherein in a case where the rechargeable battery is a lithium-ion battery, if the battery pack is in an abnormal state, when the voltage of the rechargeable battery is less than voltage within a range from 2.7 V to 3.5 V as the preset voltage value, after the rechargeable battery is charged so that its remaining capacity reaches the voltage within the range from 2.7 V to 3.5 V, the fuse is disconnected with heat by turning the switching element to ON.

8. The method according to claim 1, wherein the battery pack includes a control circuit that determines whether the battery pack is in an abnormal state, the control circuit determining that the battery pack is in an abnormal state by detecting any of abnormal current, abnormal temperature and abnormal voltage of the rechargeable battery.

9. The method according to claim 1, wherein in a state where the battery pack is controlled not in charge operation, charge current of the rechargeable battery is detected, and the battery pack is determined as in an abnormal state if the detected charge current is larger than a preset value.

10. The method according to claim 9, wherein in charge or discharge operation, or in a state where current does not flow, if the temperature of the rechargeable battery goes out of a preset value, the battery pack is determined as in an abnormal state.

11. The method according to claim 1, wherein the battery pack is determined as in an abnormal state if a short circuit is detected in a cell of the rechargeable battery.

12. The method according to claim 9, wherein in a state where current does not flow in the rechargeable battery, if the voltage variation is not less than a preset value in a preset period, the battery pack is determined as in an abnormal state.

13. The method according to claim 1, wherein the rechargeable battery is provided with a plurality of blocks that are connected in series, wherein, in discharge or charge operation, if the voltage variation of any block is not less than a preset value in a preset period, and the voltage variation of the any block is not less than a preset value compared with the voltage variation of other block, the battery pack is determined as in an abnormal state.

14. The method according to claim 1, wherein the rechargeable battery is provided with a plurality of blocks that are connected in series, and each of the blocks is provided with a plurality of battery cells that are connected in parallel, wherein if any of the battery cells are not electrically connected, the battery pack is determined as in an abnormal state.

15. The method according to claim 14, wherein the battery cells are determined as not electrically connected based on detection of the voltage variation of each block.

16. The method according to claim 1, wherein the battery pack is determined as in an abnormal state if the battery voltage is less than a preset value after charge operation for a preset period.

17. The method according to claim 1, wherein an abnormal state of the battery pack is transmitted to a device to which the battery pack is attached.

18. The method according to claim 9, wherein the battery pack includes an MPU including a control and calculation portion that composes the control circuit, and A/D converter that converts analog signals of the voltage, current and temperature of the rechargeable battery into digital signals, wherein the control and calculation portion as the control circuit determines that the battery pack in an abnormal state based on the output signals of the A/D converter.

19. A method for controlling a battery pack including a rechargeable battery, a fuse that is connected to the rechargeable battery in series, and a control circuit that determines whether the battery pack is in an abnormal state including the rechargeable battery, the rechargeable battery discharging through the fuse and the fuse is disconnected with heat by discharge current in this discharge operation if the control circuit determines that the battery pack is in an abnormal state, the method comprising:

determining whether the battery pack is in an abnormal state;

detecting whether the capacity or voltage of the rechargeable battery is less than a preset capacity or voltage value if it is determined that the battery pack is in an abnormal state; and disconnecting the fuse with heat by discharge current in discharge operation of the rechargeable battery after the rechargeable battery is charged if it is detected that the battery pack is in an abnormal state and the capacity or voltage of the rechargeable battery is less than the preset capacity or voltage value.

20. The method according to claim 19, wherein if the battery pack is in an abnormal state, when the capacity of the rechargeable battery is less than the preset capacity value, after the rechargeable battery is charged so that its capacity reaches the preset capacity value, the fuse is disconnected with heat by discharge operation of the rechargeable battery.

21. The method according to claim 20, wherein if the battery pack is in an abnormal state, when the voltage of the rechargeable battery is less than the preset voltage value, after the rechargeable battery is charged so that its voltage reaches the preset voltage value, the fuse is disconnected with heat by discharge operation of the rechargeable battery.

* * * * *